United States Patent Office 3,247,722
Patented Apr. 26, 1966

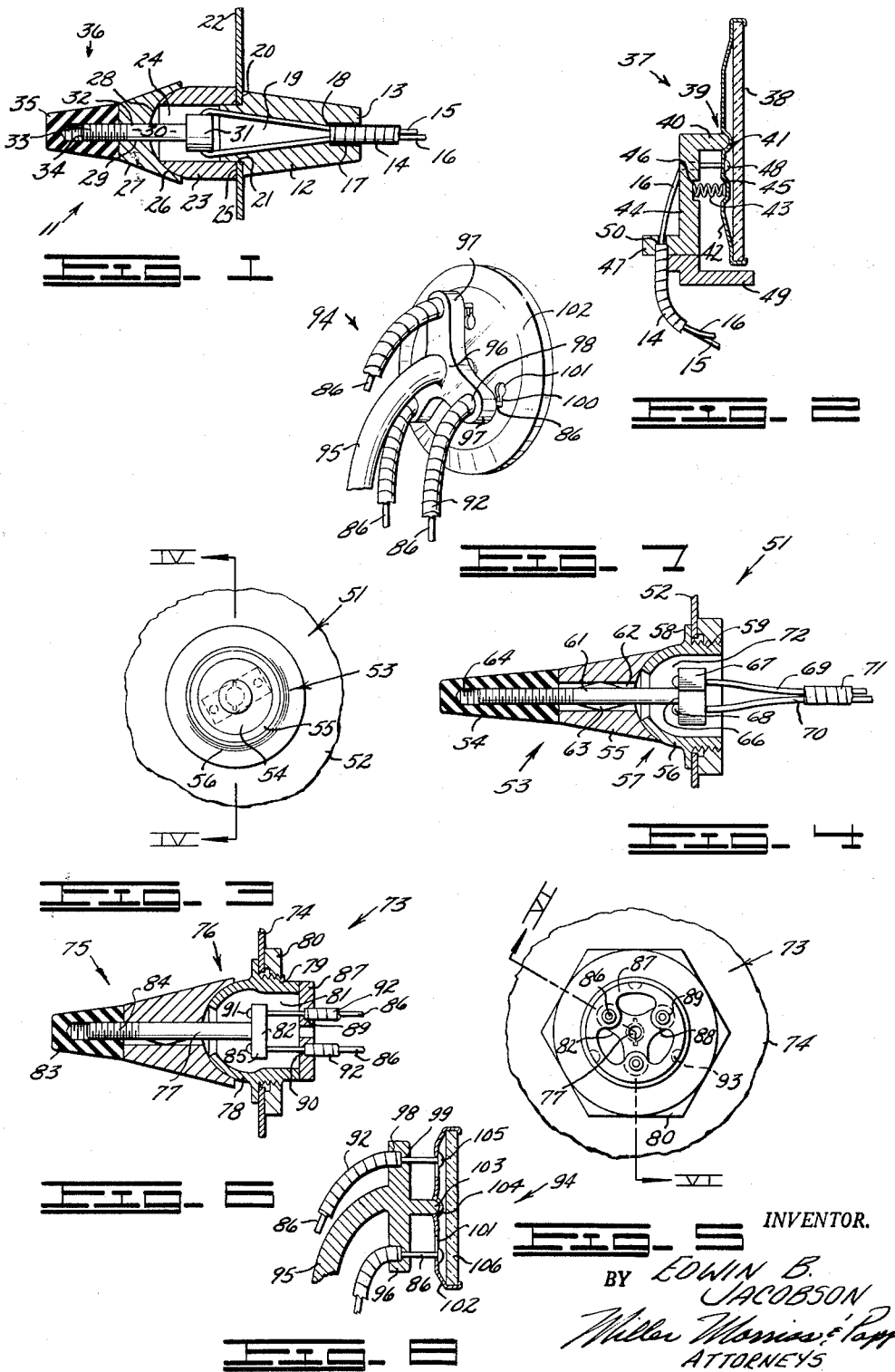

3,247,722
TENSIONING MEANS FOR UNIVERSAL
REMOTE CONTROL STRUCTURE
Edwin B. Jacobson, Grand Rapids, Mich., assignor to
Jervis Corporation, Grandville, Mich., a corporation of
Michigan
Filed May 24, 1962, Ser. No. 197,359
3 Claims. (Cl. 74—501)

The present invention relates to a tensioning and actuator means for universal remote control structures. More specifically, the present invention relates to an improved actuator structure having an axial adjustment means so as to adjustably apply tension in core wire pieces of plural wire Bowden type structures by rigid movable means. Tension is preferably applied by threaded means. The structure of the present invention has applicability to remote universal control over, for example, rearview mirrors, spotlights, and other similar naval and automotive accessories where it is desired to operate the accessory from a position remote from the accessory and so that the adjustment is smooth and a mimic of the actual movement at the actuator handle. Such accessory structures are expressed in my U.S. Letters Patent 2,931,245 and in my co-pending applications for U.S. Letters Patent Serial Number 777,887, filed on December 3, 1958 (now U.S. Letters Patent 3,030,821); and Serial Number 820,393, filed on June 15, 1959 (now U.S. Letters Patent 3,057,262) and Serial Number 842,916, filed on September 28, 1959 (now U.S. Letters Patent 3,094,582). The present application is a continuation-in-part of my copending application for U.S. Letters Patent Serial Number 818,669, filed on June 8, 1959 (now U.S. Letters Patent 3,077,152).

As will be appreciated, a serious problem in such structures as automotive rearview mirrors is to provide a unit which is cheap to produce, which is easy to maintain and which adapts itself to field adjustment as to mounting. Further, as the Bowden wire core pieces are used so that elongation occurs in tensioning, the structure must be capable of provisions for take-up of slack so that good tension is maintained in the core wires at all times intermediate the actuator element and the accessory to be controlled. Proper adjustment of tension in the elongate tension members also assures adequate control over lost motion in the system.

Accordingly, the present invention provides an actuator which is mounted for universal movement. The actuator is also provided with a movable rigid means for tensioning the core wire holding element, thus allowing for axial movement of the holding element toward and away from the actuator handle. This is preferably accomplished by threaded means. Movement of the screw or threaded member selectively tensions or relaxes tension on the core wires. It is thus seen that equal and simultaneous tension is applied to all of the plural core wires. This is very desirable in that a net tension in all of the wires assures the accessory from yielding to any chance tendency to cause movement in the accessory as by vibration and the like. In addition, the actuator herein described is applicable to two and three wire systems of control now known in the commercial field. The tensioning of the core wires places the casings or wire sheaths in compression.

It will be appreciated that springs in the control system can thus be eliminated and the actuation may thus be integrated into a rigid or relatively rigid means for adjustment of tension. While an offset spring is still required as a counter force in two wire systems, the springs are wholly avoided in three wire or four wire balanced systems. Furthermore, all adjustment may be accomplished at the actuator assembly, thus eliminating complicated structure adjacent the accessory being controlled. It will also be appreciated that so long as the tension in the elongate members is maintained beneath the yield point of the stock comprising the core piece, a certain resiliency is implicit in the elongate members themselves.

Accordingly, one of the objects of the present invention is to provide an actuator structure which eliminates springs for tensioning of the Bowden wire core elements.

Another object is to provide simplified dash mounting of Bowden wire actuators.

Still another object is to provide a structure wherein a single threaded element provides axial tension adjustment in control of all of the wires in a plural wire Bowden wire control structure.

Other objects including simplicity, dimensional adaptability, installational improvement, and better access for service will be better appreciated as the description proceeds.

In the drawings:

FIGURE 1 is a full cross-section elevation view through an actuator in accord with the present invention for a plural wire unit to accomplish remote control over an accessory element.

FIGURE 2 is a full section elevation view taken through an accessory element, served or controlled, for example, by an actuator element as shown in FIGURE 1.

FIGURE 3 is a front elevation view of a modified actuator knob in accord with the present invention serving to control an accessory remote from the actuator.

FIGURE 4 is a full section elevation view taken on the line IV—IV of FIGURE 3 and indicating the simple construction of the actuator, the securing of the actuator to a dash panel and the adjustment provisions to accomplish selected tensioning in the control wire elements.

FIGURE 5 is a rear elevation view taken, for example, back of a mounting panel in a three wire control actuator structure in accord with the present invention.

FIGURE 6 is a full section elevation taken on the line VI—VI of FIGURE 5 and indicating the non-resilient tensioning structure of the present invention.

FIGURE 7 is a perspective view of an accessory controlled by a three wire form of the present invention and remotely located from, for example, the actuator shown in FIGURE 6.

FIGURE 8 is a full cross section view through the accessory support structure shown in FIGURE 7 and indicating how the accessory is tensionally gripped and urged into universal contact with a central ball element.

GENERAL DESCRIPTION

In general, the invention comprises an actuator support structure and means forming a part of that support structure for providing a tension to wire control elements. The wire control elements extend from the actuator and to the accessory element, remote from the actuator, and to which accessory corresponding movement must be imparted. In contrast to prior devices, the tension is accomplished without the use of resilient means such as springs, except as the control wire elements are resilient in respect to the tension applied. In this invention the control elements may be stiff as, for example, in the use of a solid elongate wire core. They may also comprise a relatively limp core wire as exemplified in a braided multiple strand core element. The prime requisite of the core piece is that it be capable of reasonable tensioning short of the yield point of the core material so as to transmit tension to and from both actuator and accessory served thereby. More specifically, tensioning of the plural wire control elements is accomplished by screw means accomplishing axial movement between the actuator element knob and the control wire holding element. What is thus provided is a springless or rigid tensioning structure for plural wire tension type Bowden-wire remote control devices which includes a body element having a ball and socket movable portion therein. A gripper element is universally movable with the socket and an axial movement is imparted to shift the gripper axially thereby adjusting tension in the elongate tensionable members. The accessory structure is remote from the actuator but is operably connected to the elongate tension elements.

Expressed somewhat differently, a screw means is employed to apply a selected tension to the elongated elements intermediate the actuator and the accessory served. It will be appreciated that such tension is applied as is required to provide a net tension effect in the system over any movement accomplishing the remote control. In this manner, the actuation results in a holding action against vibrational or chance movement in the system and the actuation is positive and smooth by reason of avoiding vacillation between compression and tension in the control wires of the system.

The encased control wire elements impart a compression to the casing which is absorbed at the actuator on one end and the accessory at the other end thereof.

As will be further appreciated, considerable simplification of the actuation structure is the result of the elimination of spring means to accomplish tensioning. Collaterally, a sizing adjustment adapting the actuator units to particular dimensions is accomplished. Significant advance is accordingly obtained in installation, maintenance and service.

SPECIFIC DESCRIPTION

Referring to the drawing and more specifically to FIGURE 1, the actuator 11 of the present invention is illustrated. The actuator 11 is seen to include a tapered and generally tubular body element 12 which axially receives at its smaller end 13 a core wire sheath 14. The sheath 14 contains a plurality of elongate core wire elements 15 and 16. The body element 12 is thus provided with a sheath receiving recess 17 and the wire elements 15 and 16 pass through an axial opening 18 of reduced diameter and thence generally axially into the central recess 19 of the body element 12. Where it is desired to clinch the sheath 14, the smaller end 13 of the body 12 is merely clinched or crimped down upon the sheath 14 as shown. The body 12 is also provided with an external flange or step 20 so as to be insertable in an opening 21 provided through and attached to a mounting panel 22, which, for example, might be the dash panel of an automobile or truck. A ball piece 23 having a tubular interior wall and a through opening is coaxially provided over the body 12. The ball piece 23 continues the central and axial recess 19 of the body 12, with an axial opening or chamber 24. One end 25 of the ball piece 23 fits flush against the panel 22 and the outer end 26, away from the dash panel 22 is spherically configured. Matingly over the spherically configured end 26 of the ball piece 23 is a socket ended annular ring piece 27. The socket end 28 of the ring piece 27 is substantially hemispheric in concave form and with the ball piece 23 a limited universal action is accomplished. As will be seen, a ball and socket universal joint is hence provided in which one of the elements is movable with respect to the other. The annular ring piece 27 is provided with an axial opening 29 therethrough. The actuator rod 30 passes snugly through the ring piece 27. The actuator rod 30 thus axially extends into the chamber 24 of the ball piece 23. A wire grip element 31 is secured to the terminal end of the rod 30 inside the chamber 24. The grip element 31 secures the control wires 15 and 16, or in the instance of a continuous wire element having courses 15 and 16, grips the wire at the loop. The shank portion 32 of the rod 30 is provided with threads 33 to the end 34 thereof. A threaded female cap member 35 comprising (with the ring piece 27 and rod 30), a handle 36 is threadably provided over the threads 33 of the rod 30. Selected rotational movement of the cap member 35 of the handle 36 adjusts axial movement of the gripper element 31 and accordingly, upon assembly, applies or removes tension to the wire elements 15 and 16. When tension is applied, the body 12, ring piece 27 and ball piece 23 are all compressed into holding contact with the panel 22 and operating tension is maintained on the wires 15 and 16. In this form of the structure a two wire system of control is indicated. The case or sheath 14 is also placed in compression intermediate the actuator 11 and accessory 37, as will be seen. All control wires in the present invention may be of single or plural strand type capable of being tensioned intermediate an actuator and accessory element. The sheaths are normally a helical wire wound on or around the core piece. In some instances, plastic jackets have proved satisfactory so long as lineal movement of the core piece is not interfered with.

By reference to FIGURE 2, an accessory 37 is shown as served by the wires 15 and 16. As illustrated, the accessory 37 is shown as a mirror 38 in a suitable mounting element. The accessory 37 is mounted on a ball and socket universal 39 comprising a male hemispheric (convex) ended post 40 and a female mating concave socket 41 movable on the convex post 40. The universal 39 is centrally provided and the wires 15 and 16 are secured for the application of tension to the back 42 of the controlled accessory 37. As will be appreciated, the center of the universal 39 and the contact as between wires 15 and 16 with back 42 are in a substantially common plane defined by the back 42. One wire 16 is secured a spaced distance from and to one side of the universal 39. The other wire 15 is secured an equal spaced distance from and to the opposite side of said universal 39 so that the wires 15 and 16 are symmetrically spaced in relation to the universal 39 and so that the points of connection as between wires 15, 16 and universal 39 on the back 42 describe apex points in an equilateral triangle.

In the two wire system shown in FIGURE 2 a counterspring 43 is required. This spring is preferably of the compression type and acts between the back 42 of the accessory 37 and the support bracket 44. The spring 43 seats in recess 45 in the back 42 and in recess 46 in the bracket 44. The recesses 45 and 46 are in substantial opposed and spaced apart registry, each with the other and spaced in accord with the extent of movement desired to the back 42. The support bracket 44 is also prepared to guidably receive the wires 15 and 16. In the FIGURE 2 only wire 16 is visible. The bracket 44 receives and shoulders against the case or sheath 14 while the core wires 15 and 16 pass through the pedestal piece 47 and through the support bracket 44 into axial extended register with the terminal connections 48 in the back 42. The fit through the bracket 44 is a running fit providing for free reciprocating movement of the core wires 15 and 16. The pedestal piece 47 rests on a suitable base 49, as shown. The tension in the core pieces 15 and 16 translates to compression in the sheath 14 and the compression is taken at the shoulder 50 of the accessory 37.

The terminal connectors 48 accomplish securing of the core wires 15 and 16 to the back 42 so that as tension is applied to the wires 15 and 16, the core wires 15 and 16 will not pull out of the back 42. The connectors 48 are prepared by passing the wires 15 and 16 through the back and then upsetting the terminal ends of the wires to prevent withdrawal. As will be appreciated, the spring 43 provides a bias acting against the wire pieces 15 and 16 so that upon manipulation of the actuator 11 the two wires 15 and 16 are given control over the universal movement of yaw, pitch and roll occurring in the ball and socket universal joint 39 and translated, for example, to movement of the mirror element 38 and the attached back 42 and utilizing the control counter bias of spring element 43.

By reference to FIGURE 3, a modified two wire control actuator 51 is shown viewed attached to a dash panel 52. The handle portion 53 protrudes from the dash 52 and comprises the tension knob 54, socket sleeve 55 and flanged ball member 56. These elements may be decoratively or ornamentally enhanced to match the interior decor of, for example, a passenger car. As in the instance of the FIGURE 1 structure, a ball and socket Cardan joint 57 is thus provided, one member of which is movable universally in relation to the other. Specifically, the ball member 56 remains stationary as secured to the dash panel 52, the flange 58 of the ball member bearing on the panel 52 with the threaded shank 59 passing through the dash 52. A lock nut 60 over the threaded shank 59 locks the actuator 51 to the panel 52.

Axially through the handle portion 53 a threaded shaft 61 is provided. The shaft 61 may be keyed as by key way 62 and shaft integrated wings 63 mating in the key way 62 so that it is frictionally secured against rotational tendencies in the socket sleeve 55. The shaft 61 is, however, movable axially through the socket sleeve 55 by rotation of the tension knob 54 with its integral threads 64 acting upon the threaded portion 65 of the shaft 61. The end 66 of the shaft 61, opposite the thread 65, is provided with a gripper block 67 movable in accord with universal movement of the handle 53 at the joint 57. The gripper block 67 receives the upset terminal ends 68 of the elongate control wire tension members 69 and 70. An encasement or sheath 71 surrounds the wires 69 and 70. While not shown, a fixed compression shoulder may be provided as part of the actuator assembly or the dash panel to bear against the sheath 71. The ball member 56 is generally tubular providing a motion cavity 72 in which limited freedom of movement is permitted for the gripper block 67. By best reference to the section view of FIGURE 4, it will be appreciated that tension in the elongate core wire elements 69 and 70 is adjusted by rotation of the knob 54 which axially shifts the shaft 61 and applies selected tension to the wire elements 69 and 70. As will be also appreciated, the opposite terminal ends of the wire elements 69 and 70 are secured to the operative member of an accessory such as represented in FIGURE 2, for example. Yaw, pitch and roll control is imparted to the accessory element in accord with axial displacement of the handle portion 53 about the ball and socket universal joint 57 of the actuator 51.

By reference to FIGURE 5 a three wire embodiment of my invention is illustrated. The actuator 73 is viewed from the back side (far side from drive) of the dash panel 74. This structure is better expressed in the cross section of FIGURE 6. In general, the handle structure 75, the ball and socket arrangement or Cardan joint 76 and the shaft 77 through the handle 75 and joint 76, parallel the structure described in reference to FIGURES 3 and 4. The flanged ball element 78 is fastened to the dash 74 and a tubular threaded extension 79 extends through the dash 74 and is secured thereto by, for example, the lock nut ring 80. The cavity 81 provides moving limits for the gripper 82 secured to the shaft 77. Rotation of threaded knob 83 acting on the threaded portion 84 of the shaft 77 causes axial movement of the shaft 77 and gripper 82. The gripper 82 is provided with plural radial extensions 85 which receive the plural elongate tension carrying core members 86. The tubular extension 79 of the ball element 78 receives a spider plate 87. The spider plate 87 is provided with plural arms 88 which extend radially toward the center. These arms 88 are each provided with recesses 89 and through openings 90 positioned in spaced apart registry with the radial extensions 85 on the gripper 82. The core wire elements 86 thus pass through the openings 90 in a running fit through the spider plate 87 and are guided thereby to registering connection with the gripper 82. Upsets 91 such as a head, as shown, provide terminal attachment of the core wire elements 86 to the gripper 82 of the actuator 73. This provides suitable abutment provisions for accomplishing tensioning of the core elements 86.

The plate 87 also receives the sheath elements 92 which terminally nest in the recesses 89 where they are secured by compression. As will be appreciated, the spider plate 87 may rest upon the tripodal support legs 93 and may be indexed or secured thereto.

As will be appreciated, movement of the handle 75 at the ball and socket or universal joint 76 allows or permits limited universal movement of the shaft 77 at the joint 76 thus causing opposite corresponding relative movement of the gripper 82 and associated core wire elements 86. Rotation of the knob 83 causes axial movement of the shaft 77 thus adjustably tensioning all of the gripped core members 86 simultaneously. Accordingly, the elements of universal control over yaw, pitch, and roll are imparted when a three wire system, as shown, is employed.

The plural core wire elements 86, as shown, extend to an accessory 94 fixed in a remote position from the actuator 73, as, for example, on the fender or hood of an automobile. While the accessory structure 94 may take a variety of well known forms, an operative embodiment is shown in FIGURE 7. This comprises a fixed support 95 to which is secured a wire guide bracket 96. Radial arms 97 extend therefrom. Each of the radial arms 97 are provided with recesses 98 into which the ends of sheath elements 92 are shouldered. The core wire tension elements 86 pass through the arms 97 in openings 99 coaxially provided through the recesses 98 in the arms 97. A running fit is provided. As will be appreciated, the arms 97 and the openings 99 provide the core wire elements 86 with an axial orienting guide so that upon projection through the openings 99 they extend to registering contact with the slot portion 100 of the key hole shaped slots 101 provided in the back 102 of the accessory 94. As shown in FIGURE 8, ball ended stub 103 extends from the center of the guide bracket 96 and provides, with the central dished or concave socket 104, a joint for universal movement. Heads or upsets 105 on the terminal ends of the core wire pieces 86 provide for insertion in the key hole shaped slots 101 with tension locking or securing to the back 102 as the wire elements 86 locate in the slot portions 100, thereof. This provides for ease of attachment of wire elements 86 to the back 102 which carries, for example, a reflective element such as the mirror 106. When the core wire elements 86 are tensioned the back 102 is drawn into close socket contact with the ball ended stub 103. The sheaths 92 are compressed intermediate the actuator 73 and the accessory 94, the actuator 73 and accessory 94 each being fixed in remote positions from the other. The application of selected tension at the actuator 73 is simply accomplished applying a selected net tension to all of the plural wire elements 86. Universal movement of handle 75 causes, through movement of the core wire elements 86, corresponding movement in the accessory.

In operation the actuators, and accessories served by the actuators, are easily located and may be decoratively and aesthetically housed and trimmed. The elongate core pieces in their sheaths are adjusted to the general length of run and one terminal set of core piece ends are secured to the accessory, seating the shorter sheath ends into the compression recesses. A similar assembly is accomplished at the actuator ends of the core pieces and by upset or set screw means the wire ends are secured in the gripper assembly. Then the gripper is moved axially by the rigid adjustment acting axially of the handle and the elongate core means are thus tensioned equally. This also assures compression in the wire sheaths. The wire sheaths are ordinarily helically wound spring wire stock or plastic tubing so as to guidably contain the core wire while allowing lineal movement of the core pieces. Where desired, a common resilient gathering tube may be placed over the separate sheaths between actuator and accessory. This permits substantial movement or resiliency in the runs of control wire intermediate the actuator and accessory so that the control wires may be bent around obstructions without impairment of performance. When tension is properly applied by the rigid means the control structure provides excellent mimic performance as between the control structure actuator and the accessory controlled. As will be appreciated, the amount of universal movement possible from any one of the ball and socket universal joints at either the actuator or accessory is limited by the specific design factors involved in a particular construction. The amount of such movement may be selected as desired without departure from the spirit of the present invention. In similar manner the terminal connections of the elongate core pieces at both actuator and accessory may be varied although the arrangement specifically described has proved most useful.

While I have specifically described two operative embodiments, or embodiments of my invention as applied to plural wire Bowden type remote controls, other embodiments, modifications and improvements will be readily perceived by others in the art. Such embodiments, modifications and improvements are intended to be within the scope of my described invention limited only by the scope of the hereinafter appended claims.

I claim:
1. A remote control mechanism for control over rearview mirrors and like accessories comprising:
   (a) an accessory element;
   (b) a universal joint comprising one fixed and one movable element, said accessory element secured to said movable of said universal elements;
   (c) a plurality of elongate tension transmitting members secured to said accessory element;
   (d) an actuator element remote from said accessory element, said actuator element including a second universal joint having one fixed member and one mating movable member;
   (e) a gripper secured to said movable member for universal movement therewith and connected to said elongate tension transmitting members;
   (f) a threaded rod-like extension of said gripper member axially through said movable member of said second universal joint;
   (g) a key element restraining said threaded extension against axial rotation in said movable member of said second universal joint; and,
   (h) a knob element threadably engaging said threaded extension and thereby axially moving said gripper to apply simultaneous selected tension to said elongate tension transmitting members.

2. An actuator for Bowden type remote control devices and for tensioning the plural wires thereof, comprising:
   (a) A Cardan or universal joint including one fixed element and one movable element in mating control relation one element to the other;
   (b) a gripper element having a rod like threaded extension axially through said movable of said Cardan joint elements;
   (c) a gripper plate transverse of said gripper element on the end of said gripper element opposite said threaded extension and defining openings therethrough;
   (d) a key element intermediate said rod-like extension and said movable element comprising means restraining said rod-like extension of said gripper element from rotating with respect to said movable element in said Cardan joint;
   (e) a plurality of elongate elements to be tensioned secured through said openings in said gripper plate to said gripper plate; and,
   (f) a knob provided with female threads engaged with said threaded extension of said gripper element which knob upon axial rotation results in axial selected movement of said gripper element.

3. A tension adjustable remote control device of the Bowden wire type comprising:
   (a) an actuator structure;
   (b) an accessory structure remote from said actuator;
   (c) a plurality of elongate tensionable members intermediate said actuator and said accessory;
   (d) an elongate gripper element in said actuator structure threaded at one end and connected at the other end to one end of each of said elongate tensionable members;
   (e) a universally movable element through which said threaded gripper element axially extends;
   (f) a fixed element against which said movable universal element guidably bears;
   (g) a key element engaged between said gripper element and said universally movable element preventing relative rotation therebetween;
   (h) an actuator knob in said actuator structure having an axially threaded opening engaged over said threaded end of said gripper element and upon axial rotation said knob longitudinally moves said gripper element;
   (i) a universal joint comprising a fixed member and a mated movable member in said accessory structure;
   (j) mounting means secured to said movable member of said universal joint and defining attachment openings through which the other end of each of said elongate tensionable members are respectively attached; and,
   (k) an accessory secured to said mounting means and movable therewith.

References Cited by the Examiner
UNITED STATES PATENTS

| | | | |
|---|---|---|---|
| 1,467,218 | 9/1923 | Wilmoth | 74—502 X |
| 1,499,640 | 7/1924 | Copeland. | |
| 1,560,039 | 11/1925 | Castino | 74—501 X |
| 1,630,217 | 5/1927 | Rasor | 74—501 X |
| 1,895,560 | 1/1933 | Weir. | |
| 2,577,260 | 12/1951 | Moore | 74—502 |
| 2,713,810 | 7/1955 | Hill | 88—93 |
| 2,746,355 | 5/1956 | Wells | 88—93 |
| 2,931,245 | 4/1960 | Jacobson | 74—501 |
| 3,013,392 | 12/1961 | Falge et al. | 88—93 X |
| 3,030,821 | 4/1962 | Jacobson | 74—501 |
| 3,046,840 | 7/1962 | Barcus | 88—93 |
| 3,077,142 | 2/1963 | Jacobson | 88—93 |

BROUGHTON G. DURHAM, *Primary Examiner.*